United States Patent

McCrackin

[11] Patent Number: 5,218,342
[45] Date of Patent: Jun. 8, 1993

[54] METHOD FOR THE PRODUCTION OF NOVEL SECURE MAGNETIC TAPES

[76] Inventor: Richard J. McCrackin, 9335 Riverside Dr., Grand Ledge, Mich. 48837

[21] Appl. No.: 864,305

[22] Filed: Apr. 6, 1992

[51] Int. Cl.[5] .......................................... G05B 13/24
[52] U.S. Cl. ................... 340/572; 206/387; 340/571; 340/693
[58] Field of Search ................... 340/572, 571, 693; 206/387, 389, 1.5

[56] References Cited

U.S. PATENT DOCUMENTS

| | | | |
|---|---|---|---|
| 3,933,240 | 1/1976 | Humble | 206/1.5 |
| 4,063,229 | 12/1977 | Welsh et al. | 340/571 |
| 4,254,868 | 3/1981 | Humble et al. | 206/484 |
| 4,458,857 | 7/1984 | Moore et al. | 242/197 |
| 4,692,746 | 9/1987 | Budin et al. | 340/572 |
| 4,967,184 | 10/1990 | Regelsberger | 340/572 |
| 4,999,609 | 3/1991 | Crossfield | 340/551 |
| 5,039,982 | 8/1991 | Brühwiler | 340/572 |
| 5,081,446 | 1/1992 | Gill et al. | 340/572 |

Primary Examiner—Glen R. Swann, III
Attorney, Agent, or Firm—Ian C. McLeod

[57] ABSTRACT

A method for retrofitting a magnetic computer tape cassette (10) with a theft detection device (12) that emits an audible signal when the cassette is moved adjacent to an apparatus that detects the presence of the detection device, is described. To mount the detection device into the cassette, a groove (70) is cut into the cassette to access a cassette chamber (80) formed between an outer housing (36) that encloses an inner housing (38) that encases the magnetic computer tape (40). The detection device is then inserted into the cassette chamber through the groove and held wedged in place by a V-shaped spring (76). The groove in the cassette is finally sealed with a strip of pressure sensitive tape (88). This method of retrofitting the cassette with the theft detection device ensures that the detection device cannot be removed from the magnetic computer tape cassette without visibly damaging the cassette. This retrofitting method also has no appreciable affect in the input-/output error ratio of the data stored on the magnetic tape (40) in the cassettes.

34 Claims, 5 Drawing Sheets

METHOD FOR THE PRODUCTION OF NOVEL SECURE MAGNETIC TAPES

BACKGROUND OF THE INVENTION

(1) Field of the Invention

The present invention relates to an article that has been provided with a security detection device so that removal of the article from a secured area is signalled. More particularly, the present invention provides a method for retrofitting a magnetic computer tape cassette or cartridge with a security detection device so that removal of the cassette from an area secured by a detection apparatus for the detection device causes the detection device to emit a signal. Once installed, the detection device cannot be removed from the magnetic computer tape cassette without visibly damaging the cassette. This provides for safekeeping the cassette to prevent the unauthorized removal of the cassette from the secured area. Moreover, retrofitting the magnetic computer tape cassette with the detection device has no appreciable affect on the input/output error ratio of the data stored on the magnetic computer tape housed in the cassette. Thus, the retrofitting method of the present invention provides an alternative to purchasing new magnetic computer tape cassettes already having a security detection device installed in the cassette at the manufacturers. In addition, both the computer and operator time required to transfer data from an old, unsecure magnetic computer tape cassette to a new, secure tape cassette is eliminated. Finally, the retrofitting method of the present invention works equally as well with a small number of magnetic computer tape cassettes as with a large quantity of cassettes.

(2) Prior Art

Among the myriad of article surveillance problems are those that relate to the unauthorized removal of magnetic computer tape cassettes or cartridges from a secured area. Presently there are large numbers of existing magnetic computer tape cassettes in use that are not secured in a surveillance area by a security detection device. The problem is that these tape cassettes can be easily removed from a surveillance area which then enables unscrupulous individuals to remove, alter or delete valuable data recorded on the magnetic computer tape housed inside the tape cassettes. This can be particularly troublesome for banks, financial institutions, government agencies or many other entities that desire to protect information they have stored on magnetic computer tapes and that they deem to be proprietary.

One solution is to purchase new, magnetic computer tape cassettes that have been supplied with a security detection device at the manufacturers. However, this necessitates a program to transfer the recorded data from the old, unsecure tape cassettes to the new, secure cassettes. In addition to the cost of the new magnetic computer tape cassettes, this solution results in a considerable expense in operator and computer time to transfer the recorded data from the old tape cassettes to the new tape cassettes.

Other prior art devices have been described that are specifically adapted to secure articles other than prerecorded magnetic computer tape cassettes. These include U.S. Pat. Nos. 3,933,240 to Humble; 4,063,229 to Welsh et al; 4,254,868 to Humble et al; 4,458,857 to Moore et al; 4,999,609 to Crossfield; 5,039,982 to Bruhwiler and 5,081,446 to Gill et al.

U.S. Pat. No. 3,933,240 to Humble describes an antitheft security container for an article such as a tape cassette that prevents the unauthorized removal of the article from a protected area. The security container has a main opening for receiving the article and at least two spaced key openings. The container is made of rigid plastic material and carries an electromagnetic reradiator that triggers an alarm if the container enters a microwave field. The container includes an article retaining means having a first position clear of the main opening and a second position blocking the opening. An article release device at the point of sale includes at least two spaced apart keys that are simultaneously advanceable into the key openings in the container for shifting the retaining means from the second position to the first position. This provides for authorized removal of the article from the container.

U.S. Pat. No. 4,063,229 to Welsh et al describes an electronic theft detection and surveillance system, which uses sensor-emitter labels or tags containing a semiconductor diode directly connected to an antenna means as a receiver. The tag is applied to a protected article for purposes of surveillance and it may take various forms, one of which is a thin narrow rectangle. A transmitter coupled to an antenna establishes an electromagnetic wave field within a surveillance area. Introduction of the tag into the surveillance area causes reradiation of a different signal distinguishable from the signal produced by the transmitter. Several embodiments of transmitter and receiver are disclosed for cooperation with the tag.

U.S. Pat. No. 4,254,868 to Humble et al describes an enclosure for a security tag and an extraction implement. The enclosure is comprised of a tough tear resistant plastic that accepts a rectangular lamelliform electronic surveillance component through a slot in a paper panel. The enclosure is then secured by a pressure sensitive adhesive to a flat surface of a protected article, such as a phonograph record jacket. A razor edge implement manipulated by authorized personnel serves to sever a sidewall of a raised central portion of the enclosure and engages the component therein for convenient authorized extraction. However, after the surveillance component has been removed, a portion of the plastic enclosure remains adhered to the protected article. This is unsightly and not readily accepted by consumers.

U.S. Pat. No. 4,458,857 to Moore et al describes a security device for use with magnetic tape reels. Each magnetic tape reel is provided with a unique file protect ring disposed within an annular channel concentric with the spindle opening within the tape reel. A first plurality of recesses or projections are provided on the bottom surface of the annular channel and a corresponding and mating second plurality of projections or recesses are provided on the bottom and opposing surface of the file protect ring. The pattern of recesses, projections or both defined within the annular channel and on the bottom surface of the file protect ring uniquely associates each file protect ring with each tape reel such that a given ring will fit flushly with only one reel. This prevents erasure or overwriting on the tape.

U.S. Pat. No. 4,999,609 to Crossfield describes an antipilferage tag that includes an acoustic resonator chamber having a membrane formed of a layer of magnetostrictive material. The tag is incorporated into an antipilferage system having a generator that produces an alternating magnetic field, which triggers the magnetostrictive membrane, causing it to emit an alarm tone.

U.S Pat. No. 5,039,982 to Bruhwiler describes a unique casing that serves as a safeguard against burglary of a recorded tape cassette container. The casing includes a perforation of the wall opposite the insertion opening and extending into the casing substantially at the level of the inner surface of the angularly adjacent sidewall. Two locking bodies having a wedge-like sharpened end section are inserted into the perforation. When a recorded tape cassette container is inserted into the casing, the hinged lid of the cassette container if kept somewhat depressed by the hook-like end section of the locking bodies such that the hook-like end section engages over the adjacent sidewall of the cassette container. This serves to interlock the casing and the cassette container. The cassette container is removed from the casing by use of a special tool that ruptures the locking bodies.

U.S. Pat. No. 5,081,446 to Gill et al describes a security tag for a compact disc container holding a compact disc. The security tag is comprised of a generally flat substrate which includes circuitry for establishing a resonant circuit. The substrate is positioned within the compact disc storage container such that a first portion of the substrate extends beyond the periphery of the compact disc and a second portion of the substrate overlaps at least a portion of the compact disc. A part of the circuitry is located on each of the first and second portions of the substrate so that the frequency of the resonant circuit is established at least in part by interaction between the circuitry and the compact disc. The security tag is used in an electronic security system for a surveilled area, including a transmitter for transmitting electromagnetic energy into the surveilled area at a predetermined detection frequency and a receiver for detecting the presence of a security tag resonating at a detection frequency within the surveilled area.

What is not shown by the prior art and what is needed is a security detection device that can be retrofitted to a magnetic computer tape cassette housing a recorded magnetic computer tape to prevent the unauthorized removal of the tape cassette from an area secured by a security system. The security system transmits electromagnetic energy into the threshold of the secured area, which triggers a receiver comprising part of the security detection device mounted on the computer tape cassette. When the security detection device enters the electromagnetic umbrella of the security system, the detection device emits a signal, preferably an audible signal, that warns when the computer tape cassette is being removed from the secured area without authorization. Also, the retrofitting process must be able to be performed without any appreciable effect on the input/output error ratio of the data stored on the magnetic computer tape. Furthermore, the retrofitting process must ensure that removal of the security detection device from the tape cartridge will noticeably damage the computer tape cassette. Finally, it is believed that the Office of the Comptroller of the Currency has required procedures for all banks, financial institutions and other like organizations to protect their magnetic computer tape cassettes from unauthorized access. The retrofitting procedure of the present invention provides an alternative to spending large sums of money on new magnetic computer tape cassettes and to forgo the computer and operator time required to transfer the data.

OBJECTS

It is therefore an object of the present invention to provide an article with a detection device that prevents the unauthorized removal of the article from a secured area. Further, it is an object of the present invention to provide a method for retrofitting a magnetic computer tape cassette with a detection device that signals when the cassette is in the proximity of an apparatus that detects the presence of the detection device. Still further, it is an object of the present invention to provide a method for retrofitting a magnetic computer tape cassette with a detection device that signals when the cassette is being removed from a secured area and wherein the input/output error ratio of the data stored on the magnetic computer tape housed in the cassette remains unaffected by the retrofitting procedure. Furthermore, it is an object of the present invention to provide a method for retrofitting a magnetic computer tape cassette so that the cassette is prevented from being removed from a secured area and which method serves to forgo the computer and operator time required to transfer data from an old, unsecure magnetic computer tape cassette to a new cassette already having a security detection device installed at the manufacturers. Finally, it is an object of the present invention to provide a method for retrofitting a magnetic computer tape cassette with a detection device that signals when the cassette is being removed from a secured area and which retrofitting method is a relatively simple and inexpensive procedure that very precisely mounts the detection device on the cassette so that the detection device cannot be removed without physically damaging the cassette. These and other objects will become increasingly apparent by reference to the following descriptions and to the drawings.

GENERAL DESCRIPTION

The present invention relates to an improvement in an article containing an enclosed element to be protected from removal from an area secured by a detection apparatus, which comprises: a detection means mounted in a housing for the article with the housing surrounding the enclosed element; and a spring means mounted in the housing and against the detection means so that the detection means is wedged against the housing by the spring means so that the detection means cannot be removed from the housing without destroying the integrity of the housing, wherein the detection apparatus makes a signal when the detection means in the article is passed near the detection apparatus thereby detecting the article's removal from the area secured.

Further, the present invention relates to an improvement in a tape cassette containing a detection means and including a circular reel supporting a tape mounted on a spindle in a housing supporting the reel wherein the housing is provided with a circular inner wall with an inside surface and an outside surface around the reel and enclosing the reel in the housing except for an entry opening for removing the tape from and rewinding the tape onto the reel and wherein the housing has an outer wall mounted around the outside surface of the inner wall and having a generally rectangular shape surrounding the inner wall and comprising four outside sides joining to form four outer corners with at least one chamber between the inner wall and the outer wall of the housing and adjacent one of the corners, which comprises: the detection means mounted in the one chamber across the one corner between two of the outside sides; and a spring means mounted either between the outside surface of the inner wall and the detection device or between the outer wall of the housing and the detection device so that the detection device cannot be removed from the one chamber without destroying the integrity of the outer wall of the housing, wherein the detection device creates a signal when the cassette is passed near a separate detection apparatus thereby detecting the detection device in the cassette.

Still further, the present invention relates to a method for mounting a detection means in an article having a housing surrounding an enclosed element to be protected from being removed from an area secured by a detection apparatus, which comprises: providing a slot in an outer wall of the housing of the article without damaging the element and to access a chamber provided between the outer wall and an inner wall of the housing that encloses the element to be protected; inserting a detection means through the slot and into the chamber in the housing; and inserting a spring means through the slot and into the chamber in the housing so that the detection means is wedged in the chamber, wherein the detection means is not removeable from the chamber without destroying the integrity of the housing, and wherein the detection apparatus creates a signal when the detection means in the article is passed near the detection apparatus.

Finally, the present invention relates to a method for mounting a detection means in a tape cassette containing a circular reel supporting a tape mounted on a spindle in a housing supporting the reel wherein the housing is provided with a circular inner wall with an inside surface and an outside surface around the reel and enclosing the reel in the housing except for an entry opening for removing the tape from and rewinding the tape onto the reel and wherein the housing has an outer wall mounted around the outside surface of the inner wall and having a generally rectangular shape surrounding the inner wall and comprising four outside sides joined to form four outer corners with at least one chamber between the inner wall and the outer wall of the housing and adjacent one of the corners, the improvement which comprises: providing a saw means with a circular blade to cut into the outer wall of the cassette to provide a slot in the housing; passing the cassette through the circular blade to cut the slot in the housing and into the chamber; inserting the detection means through the slot and into the chamber for mounting the detection means across the one corner between two of the outside sides; and inserting a spring means into the chamber through the slot so that the detection means is wedged in the chamber and cannot be removed from the chamber without destroying the integrity of the outer wall of the cassette, wherein the detection means creates a signal when the cassette is passed near a separate detection apparatus thereby detecting the detection means.

SPECIFIC DESCRIPTION

Figure 1:
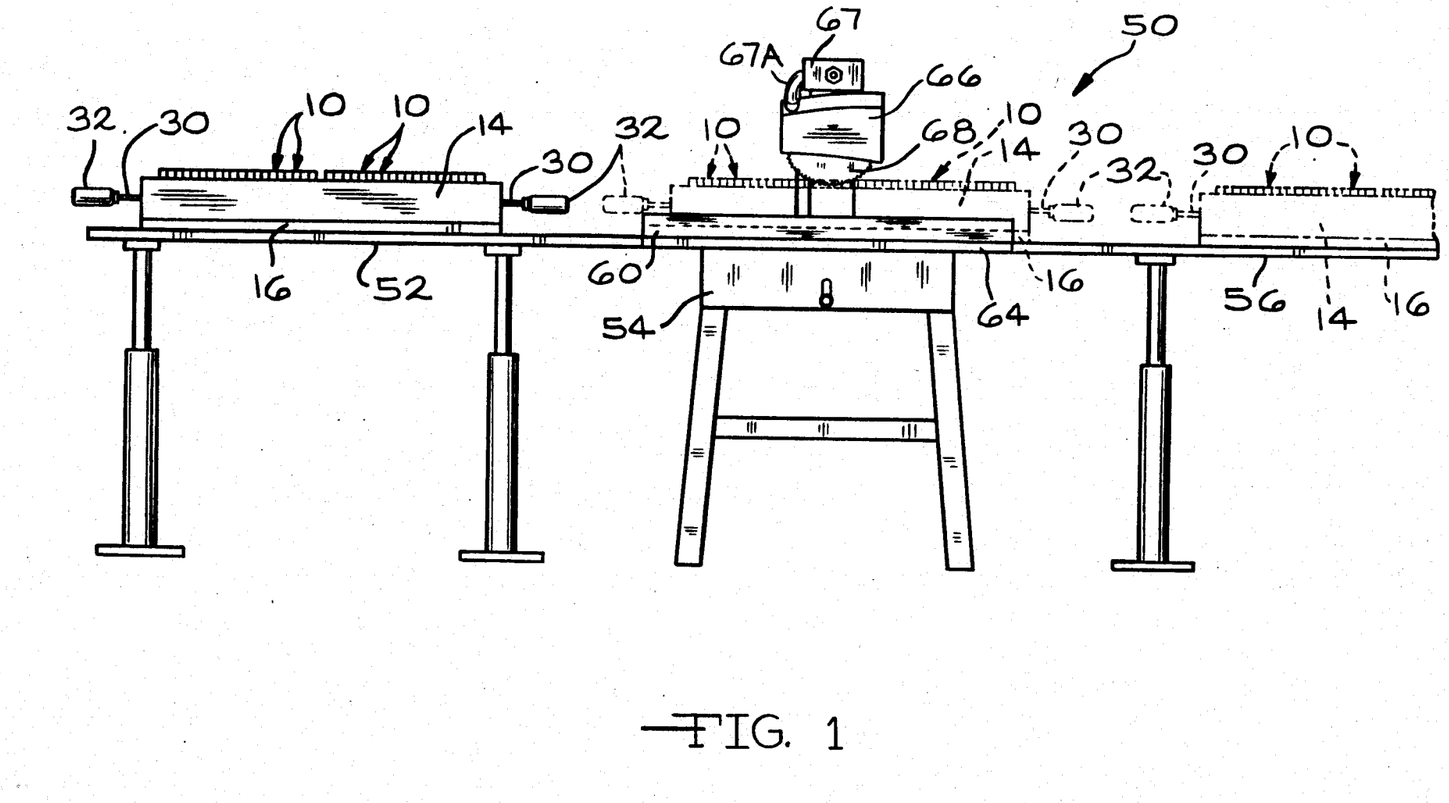
FIG. 1 is a side view of an assembly line 50 comprised of a feeder station 52 connected to a cutting table 54 that leads to a finishing station 56 to prepare a plurality of magnetic computer tape cassettes 10 for retrofitting with a theft detection device 12.
Figures 2, 3:
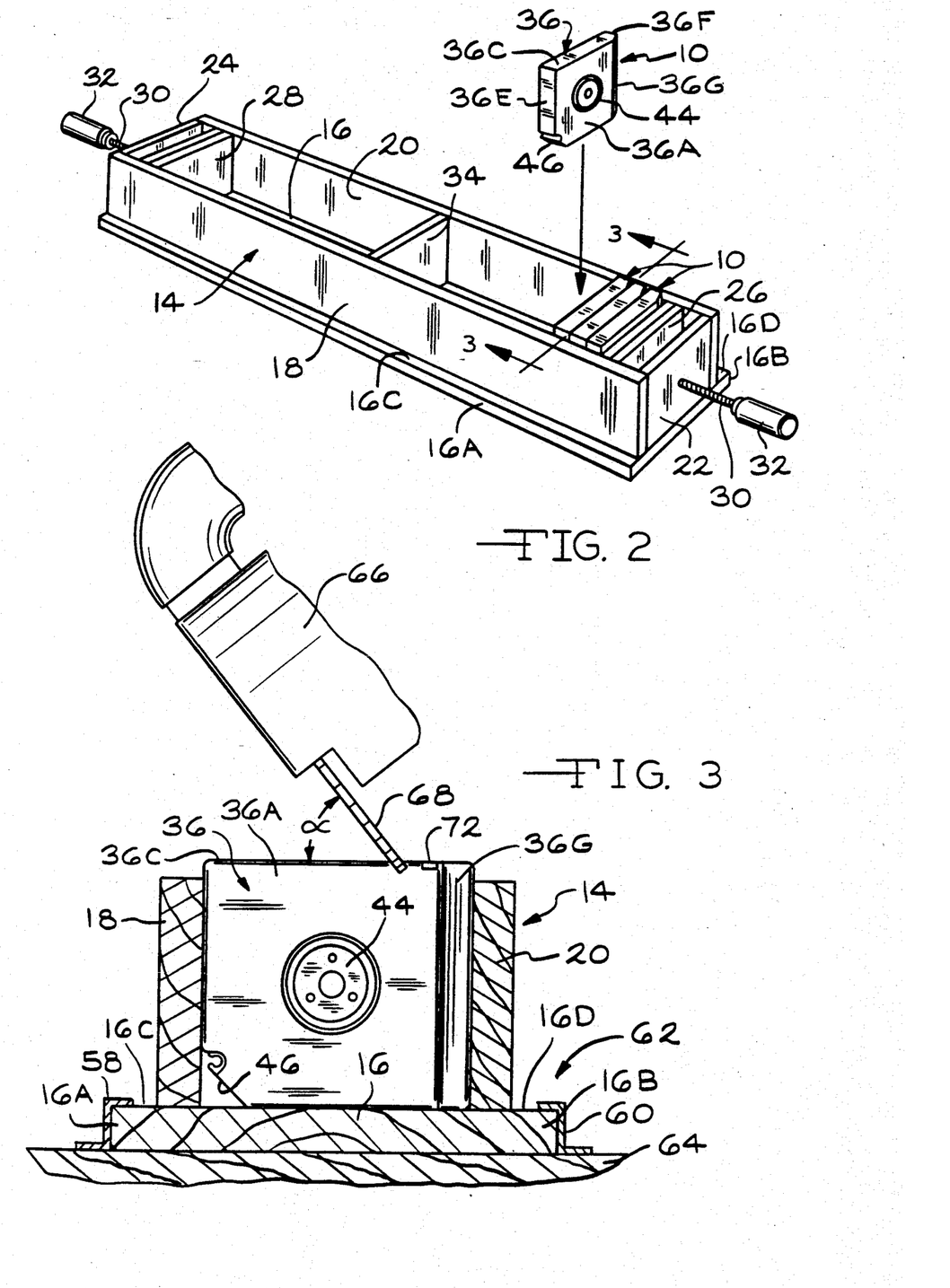
FIG. 2 is a perspective view showing a magnetic computer tape cassette 10 being mounted in a holder 14 for the cassettes 10.
FIG. 3 is a partial cross-sectional view along line 3—3 of FIG. 2 showing a circular saw 66 with saw blade 68 cutting into a magnetic computer tape cassette 10 mounted in the holder 14.
Figure 4:
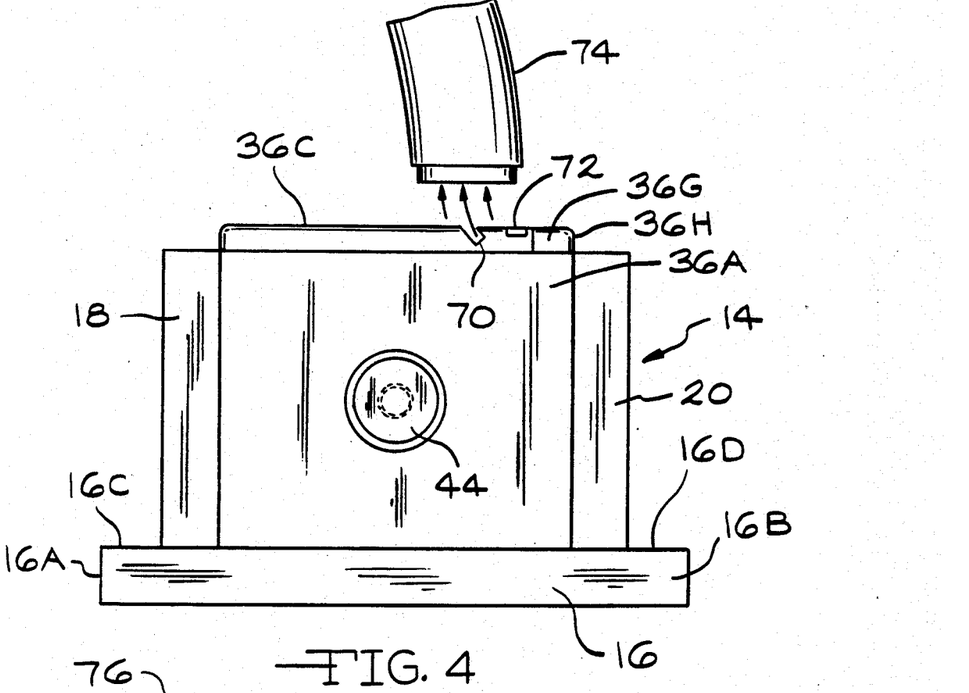
FIG. 4 is an end view showing a vacuuming device 74 cleaning out the groove 70 cut into the magnetic computer tape cassette 10 held in holder 14.
Figure 5:
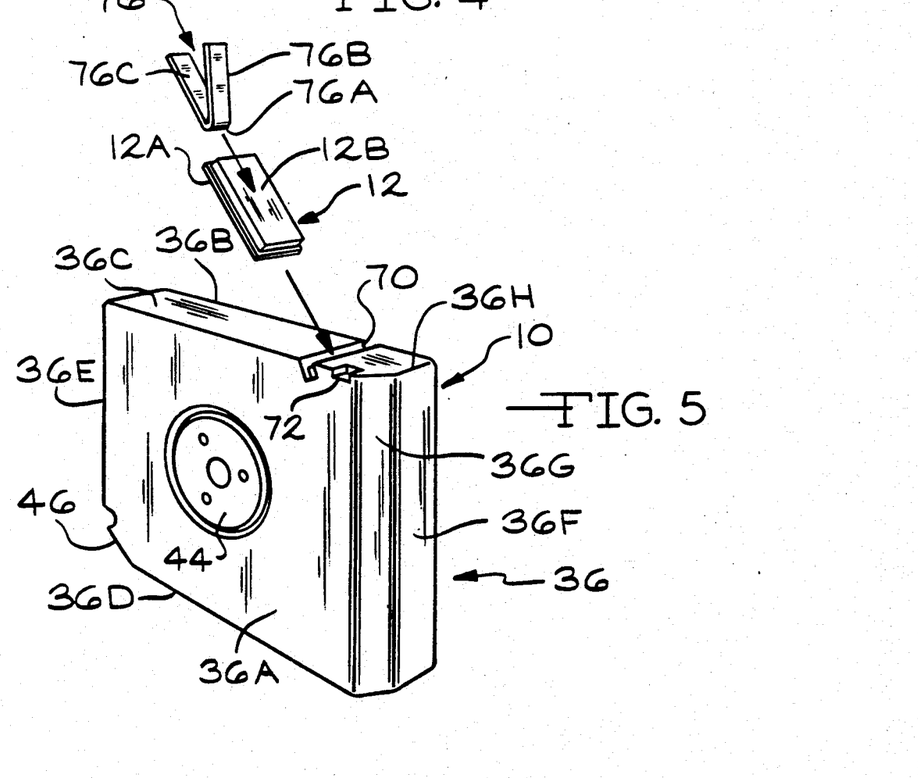
FIG. 5 is a perspective view showing the detection device 12 and V-shaped spring 76 being inserted into the magnetic computer tape cassette 10 through the groove 70.

FIGS. 1 to 10 show the preferred method of the present invention for retrofitting a magnetic computer tape cassette 10 with a detection device 12 (FIG. 5). As shown in FIG. 2, the retrofitting process begins by loading a magnetic computer tape cassette 10 to be retrofitted into a holder or template 14 for the cassette 10. The holder 14 is comprised of a base wall 16 with spaced apart side walls 18 and 20 extending from the base wall 16, spaced from the outer edges 16A and 16B of the base wall 16. This provides a pair of rails 16C and 16D on each side of the holder 14. The holder 14 is further comprised of fixed end walls 22 and 24 between the sidewalls 18 and 20 and moveable end walls 26 and 28 between the sidewalls 18 and 20 and adjacent to the fixed end walls 22 and 24. Threaded shafts 30 with handles 32 threadably mount through each of the fixed end walls 22 and 24 and connect to each of the moveable end walls 26 and 28. This provides for adjusting the distance between the fixed end walls 22 and 24 and the moveable end walls 26 and 28 to compensate for varying numbers of cassettes 10 being loaded into the holder 14. A fixed partition wall 34 is mounted between the sidewalls 18 and 20, approximately at the mid point along the length of the holder 14. The intermediate partition wall 34 serves as a stabilizer for the cassettes 10 held in the holder 14. Preferably, each half of the holder 14 is capable of holding between 1 and 20 cassettes 10.

As shown in the Figures, the magnetic computer tape cassettes 10 are of a conventional type having a generally square cross-sectioned outer housing 36 comprised of spaced apart front and back walls 36A and 36B, opposed end walls 36C and 36D with lateral walls 36E and 36F between the end walls 36C and 36D. An angled wall 36G is formed between the back wall 36A and the lateral wall 36F. The outer housing 36 encloses a circular cross-sectioned inner housing 38 (FIG. 6) that provides for mounting a length of magnetic computer tape 40 on a reel 42 (FIG. 7) supported on a spindle 44 (FIG. 5). An access door 46 provides for winding and unwinding the magnetic computer tape 40 on the reel 42. Thus, the cassettes 10 to be retrofitted are loaded in the holder 14 with the tape access door 46 facing downward and the spindle 44 facing towards the right (FIG. 2). The sidewalls 18 and 20 of holder 14 are separated by a distance that is only slightly greater than the width of the cassettes 10. After the desired number of cassettes 10 to be retrofitted are loaded into the holder 14, the handles 32 are rotated to thread the rods 30 through the fixed end walls 22 and 24 to advance the moveable end walls 26 and 28 towards the fixed partition 34. This causes the cassettes 10 to be firmly held between the intermediate partition 34 and the moveable end walls 26 and 28, and between the spaced apart side walls 18 and 20 of holder 14.

As shown in FIG. 1, after the cassettes 10 have been loaded into the holder 14, the loaded holder 14 is moved to an assembly line 50. The assembly line 50 consists of a feeder station 52, connected to a cutting table 54 leading to a finishing station 56. The assembly line 50 can be automated or the holder 14 can be moved along the assembly line 50 by hand. The loaded holder 14 begins at the feeder station 52 and is moved longitudinally along the assembly line 50 towards the cutting table 54. As shown in FIG. 3, the cutting table 54 is provided with a fence 58 and a guide 60 that together form a locking track 62. The locking track 62 serves to prevent lateral or upward movement of the holder 14 as the holder 14 moves linearly along the length of the cutting table 54. The distance between the fence 58 and guide 60 is preferably adjustable to provide for holders 14 or varying sizes. Also, the bed 64 of the cutting table 54 is preferably provided with a paraffin or other suitable lubricant. This helps the holder 14 slide over the cutting table 54 in a smooth and uniform manner.

As further shown in FIGS. 1 and 3, the cutting table 54 is provided with a circular saw 66 having a rotating saw blade 68. In the rip position (FIG. 3), the saw blade 68 is spaced a sufficient distance above the bed 64 of the cutting table 54 to allow the holder 14 with the cassettes 10 to move along the cutting table 54 while the saw blade 68 cuts a groove 70 a predetermined depth into the end wall 36C of the cassettes 10. The plane of the saw blade 68 is also at an acute angle alpha 'α' with respect to the plane of the end wall 36C being cut. Preferably, the angle alpha is between about 52 and 54 degrees, preferably 53.5°. A vacuum 67 is mounted on the saw 66 and has a hose 67A positioned adjacent to the point where the saw blade 68 cuts the groove 70 for cleaning residue pieces of the cassette 10 cut loose by the saw blade 68. As shown in FIGS. 3 to 5, the groove 70 is preferably cut adjacent to the read/write protect mechanism 72.

As the loaded holder 14 passes across the cutting table 54, the holder 14 moves to the finishing station 56. There, hanging pieces of cut material are removed from the groove 70 by rubbing a glove or cleaning towel (not shown) over the edges of the cassette 10 and by using a knife (not shown) to trim any residual pieces from the groove 70. The groove 70 can be further finished by rubbing the edges to remove any loose burrs and the like. As shown in FIG. 4, while the loaded holder 14 is still positioned at the finishing station 56, a second vacuuming device 74 is used to clean fine particles of material from the groove 70 cut into the end wall 36C of the cassette 10 and from the adjacent areas, such as the read/write protect mechanism 72.

After the groove 70 has been trimmed and cleaned, the theft detection device 12 and a V-shaped biasing spring 76 are inserted into the cassette 10 through the groove 70 (FIG. 5). As previously described, the cassette 10 is comprised of the generally square cross-sectioned outer housing 36 surrounding an inner housing 38. This provides chambers 78, 80 and 81 between the inner housing 38 and the outer housing 36 of the cassette 10. Preferably, the groove 70 has been cut into chamber 80, which is diagonally opposite the tape access door 46. The tape access door 46 provides entry for winding and unwinding the magnetic tape 40 wound on the reel 42 mounted on the spindle 44 in the inner housing 38 of cassette 10. As shown in FIG. 5, the detection device 12 is an elongate, flat member having a generally rectangular shape with a wide side 12A and a narrower side 12B. The detection device 12 is preferably a Sensormatic TM Security Detection Device, model ZL-2, manufactured by Sensormatic Electronics Corporation, Hollywood, Fla. Other types of detection devices are contemplated by the scope of the present invention.

Figure 6:
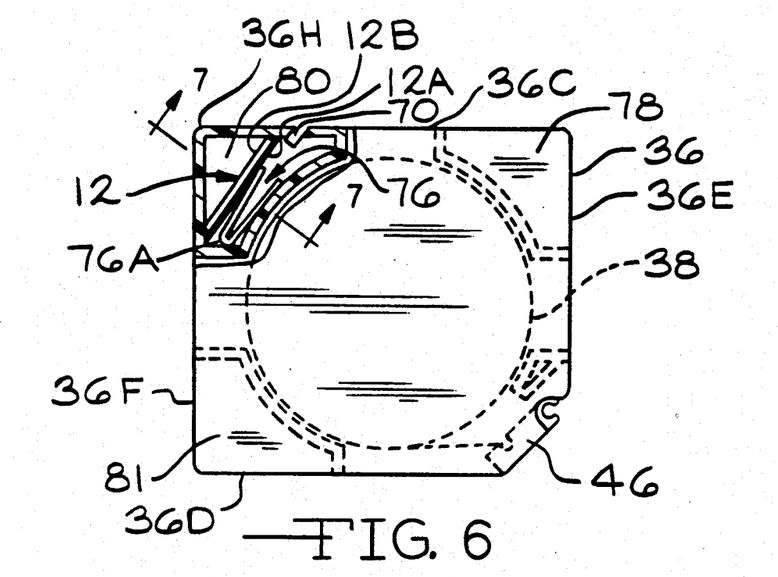
FIG. 6 is a partial cross-sectional view showing the detection device 12 held wedged in the compartment of the magnetic computer tape cassette 10 by the V-shaped spring 76.
Figure 7:
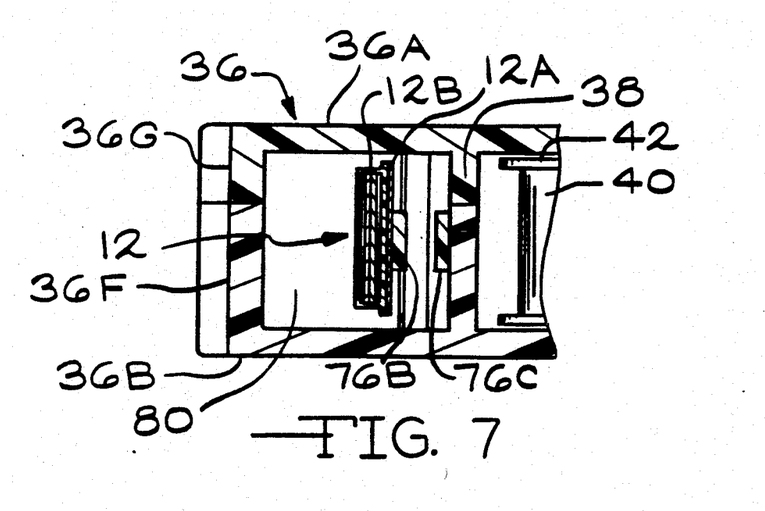
FIG. 7 is a cross-sectional view along line 7—7 of FIG. 6 showing the detection device 12 and the V-shaped spring 76 in the compartment 80 of the magnetic computer tape cassette 10.

To insert the detection device 12 into the cassette 10, the handles 32 on the cassette holder 14 are unthreaded to relax the moveable walls 26 and 28. The cassettes 10 are then removed from the holder 14 and held so that when the detection device 12 is inserted into the chamber 80 through the groove 70, the detection device 12 will be positioned spaced from the inner housing 38 and adjacent to the corner 36H formed at the intersection of the end wall 36C with the lateral wall 36F and the inclined angled wall 36G of the outer housing 36. In this position, the wide side 12A is facing the magnetic tape 40 in the inner housing 38 and the narrower side 12B is facing the corner 36H. The V-shaped spring 76 is then inserted through the groove 70 and into the chamber 80. As shown in FIGS. 6 and 7, the spring 76 serves to hold the detection device 12 wedged in the chamber 80, adjacent to the corner 36H of the outer housing 36.

The V-shaped spring 76 is preferably formed from a 2.125 inch (5.4 cm) strip of Panduit PLT4H-TL Nylon Cable Tie, manufactured by Panduit Electrical Group, Finley Park, Ill. The strip is folded in half and the ends are pressed together to form the V-shaped spring 76. The spring 76 is then inserted through the groove 70 and into the chamber 80, apex 76A first. As shown in FIG. 7, once inside the chamber 80, the legs 76B and 76C spring apart to hold the detection device 12 securely in place in the chamber 80. The spring 76 serves to prevent removal of the detection device 12 from the chamber 80 without destroying the integrity of the outer housing 36 of the cassette 10 and the chamber 80.

Figure 8:
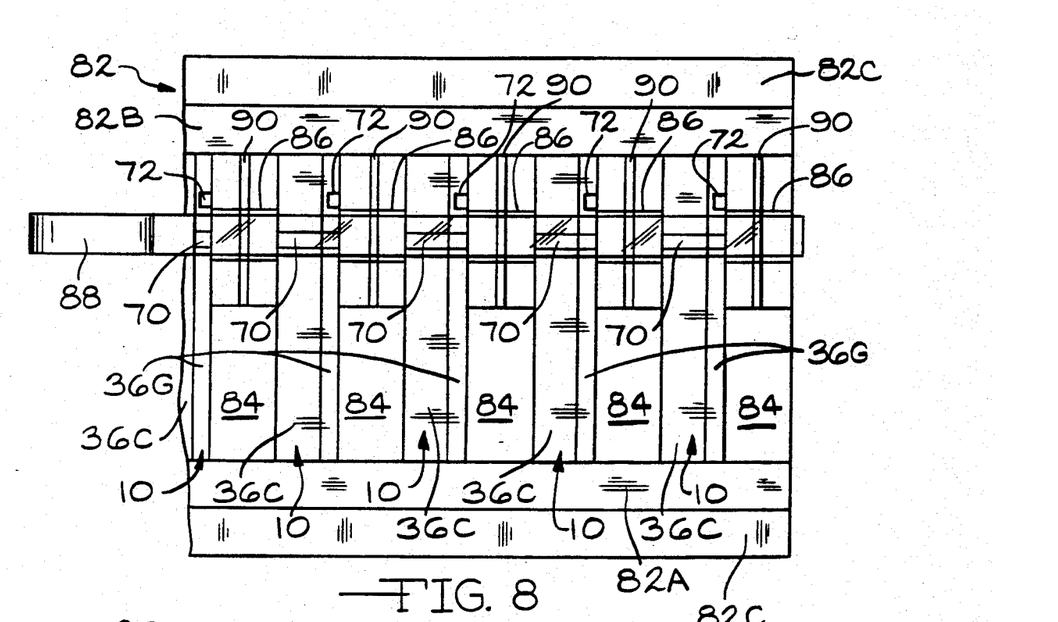
FIG. 8 is a plan view showing a plurality of magnetic computer tape cassettes 10 mounted in a taping holder 82 for sealing the grooves 70 cut into the cassettes 10 with pressure sensitive tape 88.
Figures 9, 10:
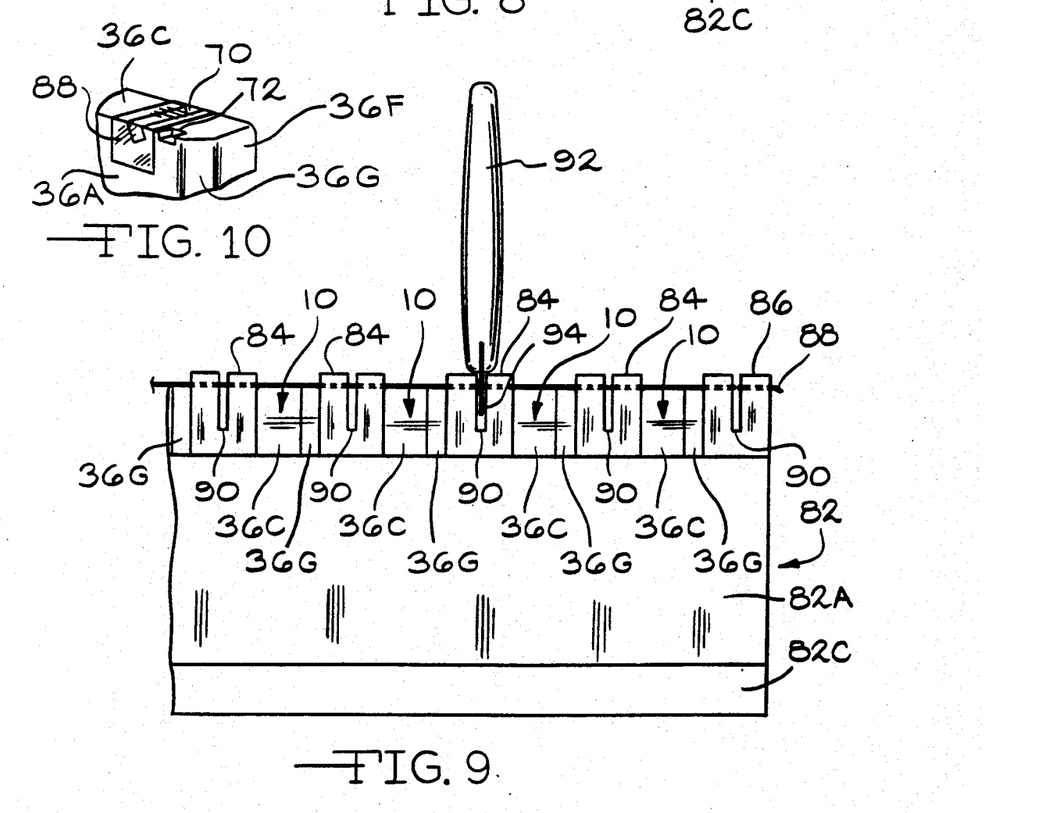
FIG. 9 is a side view of the taping holder 82 showing the spacers 84 between the magnetic computer tape cassettes 10 and with the central notch 90 in the spacers 84 for cutting the pressure sensitive tape 88 with a knife 92.
FIG. 10 is a perspective view showing the pressure sensitive tape 88 sealing the groove 70 in the magnetic computer tape cassette 10.

A plurality of cassettes 10 loaded with the detection devices 12, held by the spring 76 are then mounted into compartments provided in a taping holder 82. As shown in FIGS. 8 and 9, the taping holder 82 is comprised of side walls 82A and 82B that extend from a base wall 82C and that are spaced apart a distance that is only slightly wider than the width of the cassettes 10. Spacers 84 are provided between every other cassette 10. The spacers 84 extend above the cassettes 10 (FIG. 9) and as shown in plan view in FIG. 8, are provided with a taping groove 86. The taping groove is positioned adjacent to the read/write protect mechanism 72 and in line with the groove 70 cut in each of the cassettes 10.

As shown in FIG. 8, to seal the detection device 12 inside the cassettes 10, a continuous length of pressure sensitive tape 88 is laid across the taping groove 86 of the spacers 84 and over the grooves 70 cut in the cassettes 10. The tape 88 is preferably Scotch Brand TM Pressure Sensitive Tape manufactured by 3M Corporation, Minneapolis, Minn. As shown in side view in FIG. 9, each of the spacers 84 are provided with a central notch 90 of sufficient depth to enable a knife 92 having a knife blade 94 to cut the tape 88. That portion of the tape 88 laying over the groove 70 is then firmly pressed against the end wall 36C of the cassette 10, and the cassette 10 is then removed from the taping holder 82. The ends of the tape 88 that were previously laying on the spacers 84 are folded down around the groove 70 and pressed firmly against the front and back walls 36A and 36B of the cassette 10.

The detection device 12 is thus wedged in the chamber 80 by the spring 76 and the chamber 80 is sealed by the tape 88. The retrofitted magnetic computer tape cassettes 10 can now be returned to a storage area that has been secured by a detection apparatus (not shown). Unauthorized removal of one of the cassettes 10 from the secured area will cause the detection device 12 to emit an audible signal as the cassette 10 is passed near the detection apparatus. The detection apparatus is preferably the type that sets up an electromagnetic field and the detection device 12 is preferably a magnetostrictive device comprised of a pair of ferromagnetic leaves that vibrate together when subjected to the influence of a magnetic field to create an audible, buzzing sound. Other types of detection devices 12 and detection apparatus are contemplated by the scope of the present invention as long as the detection device 12 is able to be mounted inside the cassette 10 without affecting the input/output error ratio of the data stored on the magnetic computer tape 40. Also, the detection device 12 needs to emit a signal that warns when the cassette 10 is being removed from a secured area without authorization.

It should also be understood that the spring 76 need not necessarily have a V-shape. Instead, spring 76 can be a coil spring, a leaf spring or any other type of spring that holds the detection device 12 wedged into the chamber 80. What is required, is that once the detection device 12 is positioned inside the chamber 80, the spring ensures that it cannot be removed from the chamber 80 without visually damaging the cassette 10.

It is intended that the foregoing descriptions be only illustrative of the present invention and that the present invention be limited only by the hereinafter appended claims.

I claim:

1. In an article containing an enclosed element to be protected from removal from an area secured by a detection apparatus, the improvement which comprises:
  (a) a detection means mounted in a housing for the article with the housing surrounding the enclosed element; and
  (b) a spring means mounted in the housing and against the detection means so that the detection means is wedged against the housing by the spring means so that the detection means cannot be removed from the housing without destroying the integrity of the housing, wherein the detection apparatus makes a signal when the detection means in the article is passed near the detection apparatus thereby detecting the article's removal from the area secured.

2. The article of claim 1 wherein the spring means is a V-shaped spring means having two legs extending from the V.

3. The article of claim 1 wherein a slot is provided in the housing leading to an enclosed space inside the housing and wherein the spring means is mounted in the enclosed space with the legs extending towards the slot.

4. The article of claim 3 wherein the slot has been cut into the housing.

5. The article of claim 3 wherein the slot is covered with a sealing means.

6. The article of claim 5 wherein the sealing means is an adhesive coated plastic tape.

7. The article of claim 1 wherein the detection means is a flat, elongate member.

8. The article of claim 1 wherein the detection means includes overlapping metal leaves that vibrate together to produce an audible noise as the signal when the detection means is exposed to an electromagnetic field created by the detection apparatus.

9. The article of claim 1 wherein the spring is made of plastic.

10. The article of claim 1 wherein the element is a computer tape and the article is a cassette housing for the computer tape.

11. The article of claim 1 wherein when the detection device is mounted in the housing, the detection device is spaced from the enclosed element.

12. In a tape cassette containing a detection means and including a circular reel supporting a tape mounted on a spindle in a housing supporting the reel wherein the housing is provided with a circular inner wall with an inside surface and an outside surface around the reel and enclosing the reel in the housing except for an entry opening for removing the tape from and rewinding the tape onto the reel and wherein the housing has an outer wall mounted around the outside surface of the inner wall and having a generally rectangular shape surrounding the inner wall and comprising four outside sides joining to form four outer corners with at least one chamber between the inner wall and the outer wall of the housing and adjacent one of the corners, the improvement which comprises:
  (a) the detection means mounted in the one chamber across the one corner between two of the outside sides; and
  (b) a spring means mounted either between the outside surface of the inner wall and the detection device or between the outer wall of the housing and the detection device so that the detection device cannot be removed from the one chamber without destroying the integrity of the outer wall of the housing, wherein the detection device creates a signal when the cassette is passed near a separate detection apparatus thereby detecting the detection device in the cassette.

13. The cassette of claim 12 wherein the spring means is a V-shaped spring means having two legs extending from the V.

14. The cassette of claim 13 wherein a slot is provided in one of the outside sides of the outer wall of the housing adjacent where the detection device is mounted in the one chamber and wherein the spring means is mounted in the one chamber with the legs extending towards the slot.

15. The cassette of claim 14 wherein the slot has been cut into the outer wall.

16. The cassette of claim 14 wherein the slot is covered with a sealing means.

17. The cassette of claim 16 wherein the sealing means is an adhesive coated tape.

18. The cassette of claim 12 wherein the detection means is a flat, elongate detection device having a flat portion of the detection device facing towards the inner wall of the housing and with the spring means mounted between the outside surface of the inner wall of the housing and the flat portion of the detection device.

19. The cassette tape of claim 12 wherein the detection device includes overlapping metal leaves that vibrate together to produce an audible noise as the signal when the detection device is exposed to an electromagnetic field created by the detection apparatus.

20. The cassette of claim 12 wherein the spring means is made of plastic.

21. The cassette tape of claim 12 wherein the housing is shaped for use in a computer.

22. A method for mounting a detection means in an article having a housing surrounding an enclosed element to be protected from being removed from an area secured by a detection apparatus, which comprises:
(a) providing a slot in an outer wall of the housing of the article without damaging the element and to access a chamber provided between the outer wall and an inner wall of the housing that encloses the element to be protected;
(b) inserting a detection means through the slot and into the chamber in the housing; and
(c) inserting a spring means through the slot and into the chamber in the housing so that the detection means is wedged in the chamber, wherein the detection means is not removeable from the chamber without destroying the integrity of the housing, and wherein the detection apparatus creates a signal when the detection means in the article is passed near the detection apparatus.

23. The method of claim 22 wherein the slot in the outer wall of the housing of the article is provided by a saw means having a blade cutting the slot in the housing.

24. The method of claim 23 wherein dust generated by the saw blade cutting the slot in the housing is removed by a vacuum device.

25. The method of claim 22 wherein the detection means is wedged against an inside portion of the housing by the spring means.

26. The method of claim 22 wherein an adhesive coated tape is applied over the slot in the housing after the spring means and detection means are inserted into the chamber in the housing.

27. A method for mounting a detection means in a tape cassette containing a circular reel supporting a tape mounted on a spindle in a housing supporting the reel wherein the housing is provided with a circular inner wall with an inside surface and an outside surface around the reel and enclosing the reel in the housing except for an entry opening for removing the tape from and rewinding the tape onto the reel and wherein the housing has an outer wall mounted around the outside surface of the inner wall and having a generally rectangular shape surrounding the inner wall and comprising four outside sides joined to form four outer corners with at least one chamber between the inner wall and the outer wall of the housing and adjacent one of the corners, the improvement which comprises:
(a) providing a saw means with a circular blade to cut into the outer wall of the cassette to provide a slot in the housing;
(b) passing the cassette through the circular blade to cut the slot in the housing and into the chamber;
(c) inserting the detection means through the slot and into the chamber for mounting the detection means across the one corner between two of the outside sides; and
(d) inserting a spring means into the chamber through the slot so that the detection means is wedged in the chamber and cannot be removed from the chamber without destroying the integrity of the outer wall of the cassette, wherein the detection means creates a signal when the cassette is passed near a separate detection apparatus thereby detecting the detection means.

28. The method of claim 27 wherein the detection means is an elongate detection device mounted in the one chamber across the one corner between two of the outside sides and wherein the spring means is mounted either between the outside surface of the inner wall and the detection device or between the outer wall of the housing and the detection device for preventing the detection device from being removed from the one chamber without destroying the integrity of the outer wall of the housing.

29. The method of claim 27 wherein the spring means is V-shaped with elongate legs extending from the V and wherein the detection means is a flat, elongate detection device that is positioned in the chamber of the housing across the one corner between two of the outside sides and facing the outside surface of the inner wall of the housing with the legs of the spring means extending towards the slot in the housing for wedging the detection device in the chamber.

30. The method of claim 27 wherein particles generated by the saw blade cutting the housing are removed by a vacuum device.

31. The method of claim 27 wherein an adhesive coated tape is applied over the slot in the housing after the spring means and detection means are inserted into the housing.

32. The method of claim 27 wherein multiple of the cassettes are confined in a holder so that the slot can be cut in each cassette by a single pass of the blade.

33. The method of claim 32 wherein the holder is mounted on a rail which confines the holder to move in a linear path through the blade to produce the slots in the cassettes.

34. The method of claim 33 wherein a second holder with spaced apart partitioned walls is used to mount the slotted cassettes in a spaced apart parallel position with the slots exposed and wherein a length of adhesive tape is laid over the slots in the cassettes mounted in the second holder and then the tape is cut to a length sufficient for covering the slot in each cassette for sealing each slot.

* * * * *